United States Patent Office 2,710,426
Patented June 14, 1955

2,710,426
PROCESS FOR PREPARING THIN FILMS

Norbert J. Platzer and Frank A. Carlson, Jr., Springfield, Mass., assignors to Monsanto Chemical Company, St. Louis, Mo., a corporation of Delaware No Drawing. Application September 16, 1952,
Serial No. 309,932

5 Claims. (Cl. 18—57)

This invention relates to thin self-supporting films of vinyl chloride polymers and copolymers. More particularly, the invention relates to a process for preparing such thin films from aqueous dispersions of the polymers and copolymers.

Vinyl chloride polymers and copolymers may be easily and quickly prepared by polymerization in aqueous media. At the end of the process a more or less stable suspension or dispersion of polymer particles in water is obtained. Many attempts have been made to prepare films by casting these dispersions, driving off the water and fusing the resin. When such films are cast onto a surface with the intent that they deposit a permanent coating on the surface, the process has been reasonably successful since the adhesion of the polymers to metal, fabric, paper and wood, etc. surfaces serves to increase the strength of the deposited films.

However, when self-supporting films have been prepared from such compositions, particularly when no plasticizer is used, the films have been, almost without exception, quite brittle and non-uniform in physical properties. The brittleness of the films has made it almost impossible to remove the films from the casting surface because the adhesion of the resin to the casting surface is greater than the cohesion of the resin particles to each other. In addition, samples taken at random from the film show wide variance in tensile strength and elongation.

One object of this invention is to provide a thin self-supporting film of a vinyl chloride polymer or copolymer.

Another object of this invention is to provide a process for preparing thin self-supporting films from aqueous dispersions of vinyl chloride polymers and copolymers.

Still another object is to provide a process for preparing thin self-supporting films having uniform physical properties from aqueous dispersions of polymers and copolymers of vinyl chloride.

These and other objects are attained by casting a dispersion having certain critical properties and forming the film under certain critical conditions as will be set forth in detail below.

The following examples are given in illustration and are not intended as limitations on the scope of this invention. Where parts are mentioned, they are parts by weight.

Example I

Prepare an aqueous dispersion of a homopolymer of vinyl chloride by any of the well-known dispersion, suspension or emulsion polymerization processes but control the operation so that the average molecular weight of the polymer is about 15,000, as determined by the Staudinger equation, and the particle size of the polymer ranges from 0.2 to 0.6 micron and averages about 0.35 micron. Any oversize particles or grits must be removed either by filtration, centrifuging or other known methods. If the solids content is below 40%, raise it to at least 40% by the addition of well-known creaming agents such as carboxymethyl cellulose, sodium alginate, etc. followed by removal of the excess water. Cast this dispersion onto a moving belt made of polished stainless steel and immediately heat both the cast film and the underside of the belt to simultaneously remove the water and fuse the resin. The resin should be dry and completely fused within 30 seconds and there should be substantially no interval between the drying and the fusing process. Remove the fused films from the belt after it has cooled sufficiently so that it may be removed without undue stretching thereof.

Example II

Prepare a copolymer of vinyl chloride and vinyl acetate of polymerization of a mixture of 85 parts of vinyl chloride and 15 parts of vinyl acetate in an aqueous medium using conventional emulsion polymerization methods. Control the polymerization process to obtain a particle size range of from 0.2 to 0.6 micron with an average particle size of about 0.42 micron and an average molecular weight of about 18,000, as determined by the Staudinger equation. Cream the resulting dispersion with 0.1 part of polyvinyl alcohol and remove the excess water to obtain a dispersion having a solids content of about 60%. Cast the dispersion in a thin film on an aluminum web and immediately heat the cast film for about 20 seconds to substantially simultaneously remove the water and fuse the resin. Remove the film from the web as soon as it is cool enough to strip from the belt without stretching.

Random samples taken from the films made in either of the examples are found to have substantially uniform tensile strengths and elongations although these properties for the film of Example II demonstrate that the copolymer film is less rigid and somewhat more flexible than the homopolymer film. Both films are clear and substantially colorless. They do not deteriorate rapidly on natural or accelerated ageing and they are substantially impermeable to water vapor.

When vinylidene chloride is substituted for the vinyl acetate of Example II, substantially similar results are obtained and the resultant films have physical properties intermediate between the properties of the films of Example I and Example II.

The polymers and copolymers which are operative in this invention are homopolymers of vinyl chloride and copolymers thereof with up to about 20% by weight of a vinyl ester or a vinylidene halide. Vinyl acetate is the preferred vinyl ester but vinyl esters of other saturated aliphatic acids may be used to obtain films having specific properties. Thus, at the same monomer concentration, increasing the number of carbon atoms in the ester group yields a progressively softer film. A vinyl stearate copolymer is not only softer but it is self-lubricating. Among the vinylidene halides which are operatives are vinylidene chloride, vinylidene fluoride and vinylidene chlorofluoride. Similar compounds containing bromine or iodine instead of chlorine or fluorine are useful in obtaining special properties in the films. The average molecular weight of the polymers and copolymers should be restricted within the range of 12,000 to 25,000, as determined by the Staudinger equation.

The polymers and copolymers should be prepared by polymerization in an aqueous medium. For some obscure reason, polymers prepared by other processes and subsequently dispersed in an aqueous medium do not fuse readily in the film-forming operation. The polymerization in an aqueous medium is generally carried out in the presence of an emulsifying or suspending agent and a free radical catalyst, preferably a peroxygen compound. By regulation of the amounts of emulsifier and catalyst, and selection of the types thereof, the process can be easily regulated to yield a suspension or dispersion of polymer particles in water, the diameter of substantially all of said particles being within the limits of 0.2 to 0.6 micron. Processes which produce particles of substantially uniform diameter should be avoided since such materials do not fuse readily to give a uniform film. However, most of the known aqueous polymerization processes produce particles of varying size so that the necessary particle size distribution is automatically attained.

The most efficient aqueous polymerization systems operate in a range of from 30 to 60% solids and all but a few of the particles are within the desired range. Frequently a few large particles or agglomerates of particles are formed which should be removed before the film casting operation. The removal may be accomplished by simple filtration, by centrifuging or other conventional means. It should be accomplished before any attempts are made to concentrate the dispersion.

For efficient operation, the dispersion to be cast should contain from 40 to 60% solids. To obtain the higher solids content, the conventional creaming operation may be employed. In this operation, a creaming agent such as carboxymethyl cellulose, sodium alginate, polyvinyl alcohol, etc. is added to the dispersion. The creaming agent serves to concentrate the resin particles in a fraction of the water phase and the extra water may be removed by decantation or other simple means for drawing off an excess of liquid.

The polymer and copolymer dispersions may be cast into thin self-supporting films on conventional casting apparatus such as a casting drum, endless belt or web by means of a knife coater, or a reverse roll coater, etc. The films are conveniently cast onto an endless belt of sufficient length to provide an efficient heating and cooling cycle on the belt before the finished film is stripped therefrom. For most economical operation, the belt should be made of a material to which the film is adherent during the heating cycle but from which the film may be stripped when cool without undue distortion of the film. A highly polished metal belt such as a stainless steel or nickel belt is satisfactory for this purpose.

The casting operation should be controlled so that the film of dispersion is of substantially the same width as desired in the final film and the thickness of the cast dispersion is greater than the thickness desired in the final film in substantially the same ratio as the ratio of water to solids in the dispersion. In other words, shrinkage on removal of water is almost entirely a shrinkage in thickness.

After the initial casting of the dispersion, the water should be removed and the resin should be fused substantially simultaneously. Even a short interval between the drying and fusing steps produces weak non-homogeneous films. The drying and fusing steps are accomplished by passing the belt through a hot zone at a temperature of about 150–220° C. At this temperature, the water flashes off almost immediately and the resin fuses within seconds thereafter. For best results, the drying and fusing are completed within 30 seconds after the dispersion is cast onto the casting surface, and preferably should be completed within about 20 seconds. The heating may be accomplished by conducting the belt through a heated oven, by blowing hot air over the cast film, by the use of infrared radiation or by electronic heating. It is advantageous to heat the under side of the casting belt at least during the second half of the drying and fusing steps. Since the casting materials are all non-inflammable, the heating may even be accomplished by direct heating of the underside of the belt with a gas flame.

During and immediately after the fusing step, the film is tightly adherent to the casting belt and cannot be easily removed therefrom. To facilitate the stripping of the film, it should be cooled to at least 80° C. This cooling may be accomplished by using a very long belt and merely allowing the belt and film to cool by convection, or it may be accomplished by directing a cold air blast against both belt and film or by flowing cold water over the film or on back of the belt. By whatever means used for cooling, the film may be easily and continuously stripped from the casting belt at temperatures below 80° C. without distorting the film.

Using the process of this invention, films may be prepared having a final thickness of between 0.0005 and 0.002 inch. Due to the necessity of simultaneously removing water and fusing the resin, it is practically impossible to prepare homogeneous films substantially thicker than 0.002 inch due to the development of bubbles, blisters or cracks in the drying step. Within the limits of 0.0005 to 0.002 inch, the thickness of the film may be easily controlled within ±0.00005 inch merely by control of the amount of dispersion originally cast onto the belt.

Due to the extreme rapidity of the drying and fusing steps, relatively high casting speeds may be attained with the process and materials of this invention. For example, it is possible to prepare a 0.001-inch film in widths up to 100 inches at rates limited only by the efficiency of the heating and fusing apparatus. The films do not show any directional strength differentials. Since the vinyl chloride polymers and copolymers are non-toxic and substantially unaffected by moisture, the films are particularly suited for use in transparent packages. They may be processed through conventional packaging machines and may be sealed by any of the methods applicable to vinyl polymers.

As a general rule, the properties ultimately desired in the film may be best obtained by varying the comonomer but is possible to use plasticizers, pigments, lubricants, fillers, etc. if desired.

It is obvious that variations may be made in the products and processes of this invention without departing from the spirit and scope thereof as defined in the appended claims.

What is claimed is:

1. A process for preparing thin self-supporting films which comprises casting a film from a 40–60% solids aqueous dispersion of a polymer of vinyl chloride on a casting surface, substantially simultaneously drying the film and fusing the resin, thereafter cooling the fused film and stripping it from the casting surface, said aqueous dispersion having been obtained by polymerization of the vinyl chloride in an aqueous medium, substantially all of the particles of the polymer in the dispersion having a diameter within the limits of 0.2 to 0.6 micron.

2. A process as in claim 1 wherein the average particle size of the polymer in the dispersion is 0.35 micron.

3. A process as in claim 1 wherein the polymer is a copolymer of vinyl chloride with up to 20% by weight of a compound taken from the group consisting of vinyl esters of saturated aliphatic acids and vinylidene halides.

4. A process as in claim 1 wherein the drying and fusing of the cast film of dispersion is completed within 30 seconds.

5. A process as in claim 1 wherein the polymer is a copolymer of 85 parts of vinyl chloride and 15 parts of vinyl acetate.

References Cited in the file of this patent

UNITED STATES PATENTS 2,600,681    Park et al. _____ June 17, 1952

FOREIGN PATENTS 437,604    Great Britain _____ Oct. 28, 1935

OTHER REFERENCES

Higgins, "Cast and Coated Films." Reprint of paper delivered at December 1951 meeting of Society of the Plastics Industry, John Waldron Corp., New Brunswick, N. J. Received by Patent Office March 13, 1952.